United States Patent [19]
Frey et al.

[11] 3,718,730
[45] Feb. 27, 1973

[54] METHOD OF TREATING BARIUM TITANATE

[75] Inventors: Dennis L. Frey, Metuchen; Sam Divita, West Long Branch; Edward J. Smoke, Edison, all of N.J.

[73] Assignee: The United States of America as represented by the Secretary of the Army

[22] Filed: June 23, 1971

[21] Appl. No.: 156,044

[52] U.S. Cl. .................... 423/81, 423/69, 423/155, 423/598
[51] Int. Cl. ........................ C01f 11/00, C01g 23/00
[58] Field of Search....23/51 R; 423/69, 81, 155, 598

[56] References Cited

UNITED STATES PATENTS 2,988,422   6/1961   Walsh ................................. 23/51 R
3,435,104   3/1969   Brandmayr ....................... 23/51 R X

OTHER PUBLICATIONS

Flaschen, "Journal of the American Chemical Society," Vol. 77, 1954, p. 6194

Rosenthal et al., "Ceramic Bulletin," Vol. 37, 1958, pp. 370–375.

*Primary Examiner*—Herbert T. Carter
*Attorney*—Harry M. Saragovitz et al.

[57] ABSTRACT

Barium titanate is upgraded by chemically treating the raw powder with acetic acid, ammonium hydroxide, or distilled water.

This invention relates in general to a method of upgrading the dielectric characteristics of ferroelectric materials and in particular to a method of upgrading commercial barium titanate.

1 Claim, No Drawings

METHOD OF TREATING BARIUM TITANATE

BACKGROUND OF THE INVENTION

Commercially available barium titanate powders are either of a very high purity and expensive or of a lower purity and less expensive. The high purity form is adequate for various electronic applications such as capacitor dielectrics where a high degree of reliability is desired. The difficulty with the high purity material is that its expense makes prohibitive its extensive use as a dielectric in capacitors.

SUMMARY OF THE INVENTION

The general object of this invention is to provide a method of upgrading the dielectric properties of barium titanate. A more particular object of the invention is to provide a method of treating commercially available barium titanate powders of a lower purity and less expensive form in such a manner that it will be suitable for use as a dielectric in capacitors.

We have found that we can upgrade barium titanate by chemically treating the raw powder with acetic acid, ammonium hydroxide, or distilled water.

DETAILED DESCRIPTION OF THE PREFERRED EMBODIMENT

Two commercially available barium titanate powders are used. Their respective oxide compositions are shown in Table I.

TABLE I

Chemical Analysis of Raw Barium Titanate Powders

| | POWDER I | POWDER II |
|---|---|---|
| Purity[a] | 99.66 | 99.57 |
| BaO | 65.40 | 65.40 |
| $TiO_2$ | 34.10 | 34.10 |
| $BaO/TiO_2$ | 0.999 | 0.999 |
| $Al_2O_3$ | .002 | .002 |
| $SiO_2$ | .005 | .005 |
| SrO | .01 | .03 |
| CaO | .010 | .010 |
| MgO | .03 | .05 |
| $ZrO_2$ | .001 | .015 |
| $Fe_2O_3$ | .012 | .014 |
| $K_2O$ | .005 | .005 |
| $Na_2O$ | .09 | .09 |
| $Li_2O$ | .14 | .18 |
| CuO | .002 | .001 |
| SnO | .001b | .001b |
| MnO | .001 | .001b |
| PbO | .001 | .001b |
| $Cr_2O_3$ | .001 | .001 |
| $P_2O_5$ | .023 | .027 |
| $SO_3$ | .010 | .005 |
| $CO_3$ | .19 | .10 |
| L.O.I. | .13 | .03 |

[a]Purity excludes carbonate content and loss on ignition.
[b]Not detected at minimum level of detection shown.

Eighty gram batches of each of the barium titanate powders are placed in 600 milliliters of each of the following solutions: 8 molar ammonium hydroxide and 6 molar acetic acid. The respective solutions are stirred for 3 hours. By the next day, the particulate has settled and each of the solutions are decanted. Six hundred milliliters of distilled water is then added to each particulate with stirring for 2 hours. Each particulate is allowed to settle overnight again, the liquid decanted, and the particulate dried.

Distilled water alone is also used for treating each of the barium titanate powders. In such a treatment, the material is boiled for two hours, followed by two distilled water washings.

Specimens of each of the particulates are then pressed at about 5 percent water content into discs one-half inch in diameter and approximately ⅛ inch thick at 10,000 pounds per square inch. The discs are then fired in a moderate vacuum of about 85 microns and at 1,300° to 1,340° C. plus 1 hour soak after an initiation soak of 1 hour at 1,170° C. The electrical results of the firings are shown in Table II.

TABLE II

| Chemical Treatment | dielectric constant powder I | dielectric constant powder II |
|---|---|---|
| None | 2878 | 2220 |
| Ammonium Hydroxide | 3160 | 3646 |
| Acetic Acid | 4175 | 4394 |
| Distilled Water | 3380 | 4423 |

Furthermore the dielectric losses of Powders I and II were found to be comparable to losses of conventional barium titanate specimens; i.e., between 1 percent and 2 percent.

We wish it to be understood that we do not desire to be limited to the exact details of manufacture as described, for obvious modifications will occur to a person skilled in the art.

What is claimed is:

1. Method of increasing the dielectric constant of barium titanate said method including the steps of:
   A. stirring the barium titanate powder for about three hours in a solution selected from the group consisting of 6 molar acetic acid and 8 molar ammonium hydroxide and allowing the resulting particulate to settle;
   B. decanting the solution;
   C. adding distilled water to the particulate with stirring and again allowing the particulate to settle;
   D. decanting the liquid and drying the particulate;
   E. pressing the particulate into a disc; and
   F. firing the disc at 1300° to 1,340° C. in a moderate vacuum of about 85 microns.

* * * * *